United States Patent
Kullborg

Patent Number: 5,782,133
Date of Patent: Jul. 21, 1998

[54] DRIVING UNIT FOR AN INDUSTRIAL ROBOT

[75] Inventor: Ove Kullborg, Västerås, Sweden

[73] Assignee: Asea Brown Boveri AB, Västerås, Sweden

[21] Appl. No.: 737,204

[22] PCT Filed: May 12, 1995

[86] PCT No.: PCT/SE95/00529

§ 371 Date: Nov. 7, 1996

§ 102(e) Date: Nov. 7, 1996

[87] PCT Pub. No.: WO95/31657

PCT Pub. Date: Nov. 23, 1995

[30] Foreign Application Priority Data

May 13, 1994 [SE] Sweden ............... 9401654

[51] Int. Cl.$^6$ .................. F16H 37/04; F16H 57/02
[52] U.S. Cl. .................. 74/420; 74/417; 74/421 A
[58] Field of Search ............... 74/420, 417, 421 A, 74/423, 89.13, 606 R

[56] References Cited

U.S. PATENT DOCUMENTS

| | | | |
|---|---|---|---|
| 1,894,927 | 1/1933 | Schmitter | 74/420 |
| 2,221,292 | 11/1940 | Trout et al. | 74/420 |
| 4,270,783 | 6/1981 | Sorensen et al. | 74/420 X |
| 4,396,344 | 8/1983 | Sugimoto et al. | |
| 5,375,479 | 12/1994 | Kouno et al. | 74/420 |
| 5,558,174 | 9/1996 | Avitan et al. | 74/420 X |

FOREIGN PATENT DOCUMENTS

| | | | |
|---|---|---|---|
| 158157 | 1/1933 | Switzerland | 74/420 |

OTHER PUBLICATIONS

Transactions of the ASME, Journal of Mechanical Design, vol. 112, pp. 430–436, dated Sep. 1990.

*Primary Examiner*—Charles A. Marmor
*Assistant Examiner*—Troy Grabow
*Attorney, Agent, or Firm*—Watson Cole Grindle Watson, P.L.L.C.

[57] ABSTRACT

A driving unit comprising an electric motor and a reduction gear unit preferably intended for an industrial robot. A gear case (11) supports a motor (10) with a shaft (12) extending into the gear case and provided with a bevel pinion (13). An intermediate shaft (15) is rotatably journalled with two bearings (16). On the intermediate shaft are fixed a larger bevel gear (14) and between the bearings a smaller cylindrical gear (17). An output shaft (20) provided with a larger cylindrical gear (18) is rotatably journalled and parallel with the intermediate shaft (15). The gears are arranged such that the bevel pinion (13) is in engagement with the larger bevel gear (14) and the smaller cylindrical gear (17) is in engagement with the larger cylindrical gear (18). The motor shaft (12) is oriented approximately perpendicular to the output shaft (20).

3 Claims, 1 Drawing Sheet

DRIVING UNIT FOR AN INDUSTRIAL ROBOT

TECHNICAL FIELD

The present invention relates to a driving unit, preferably intended for an industrial robot, comprising an electric motor having a shaft which, via a reduction angle gear unit, is connected to an output shaft. The driving unit comprises a motor and a reduction gear for driving the arm movements of the robot.

BACKGROUND ART

An industrial robot of a so-called anthropomorphic type has a stand which is rotatably arranged on a foot and which supports a first robot arm which is rotatable in relation to the stand. At the outer end of this arm, a second robot arm is rotatably journalled. This second arm supports, at its outer end, a robot hand which is provided with a tool attachment and which is rotatable in two degrees of freedom relative to the second arm. For each one of the above-mentioned robot arms and the robot hand, a driving unit is provided. The driving units for the first and second robot arms each comprise a motor and a reduction gear with very high gear ratio, for example a so-called RV gear (rotary vector) or a so-called harmonic drive. These driving units are often placed in the stand on opposite sides of the center of rotation of the first arm and are oriented with their respective motor shafts in parallel with the rotary axis of the first arm (see e.g. U.S. Pat. No. 4,396,344, FIG. 5). A drawback which arises when the driving units extend from the stand is that the "elbow-room" of the robot, defining the radius within which no objects may exist, increases and hence reduces the operating range of the robot. One way of solving the problem is to use motors with a short rotor with a large diameter. However, these are expensive.

Driving motors for industrial robots currently consist of inverter-fed synchronous motors with permanent magnets in the rotor. The performance of these motors is primarily determined by the volume and the ratio between the length of the rotor and its diameter. A large diameter provides a greater torque whereas a smaller diameter provides a smaller moment of inertia and hence a higher acceleration. The most cost-effective motor is obtained when the quotient between the length of the rotor and its diameter approaches 1, which, because of the extension of the stator winding and bearing shields, gives the motor a long and narrow appearance. The inferior torque which is obtained with such a motor may be compensated for by a higher speed and a greater gear ratio.

The number of revolutions of the motor is largely determined by the speed of the electronics in the inverter which is to drive the motor, and currently speeds up to about 4,000 RPM (revolutions per minute) are possible. To be able to utilize a motor with a speed of up to 4,000 RPM, the gear must be capable of reducing the speed by a factor of 240. With acceptable gear wheel diameters, this cannot be achieved with a parallel-axes gear unit in two steps. This necessitates changing to a three-step gear unit.

SUMMARY OF THE INVENTION

The object of the present invention is to provide a cost-effective driving unit for an industrial robot, which driving unit comprises a motor and a gear unit and which possesses the properties of high reduction gear ratio with a minimum of play, fast acceleration and a minimum overall volume. This is achieved according to the invention by a driving unit comprising a transversely oriented, elongated motor, the projection of which lies on the gear case, and a gear unit with two steps. The first step comprises a bevel gear pair and the second step a cylindrical gear pair.

BRIEF DESCRIPTION OF THE DRAWINGS

The invention will be explained in greater detail by describing embodiments with reference to the accompanying drawing, wherein.

DESCRIPTION OF THE PREFERRED EMBODIMENTS

Figure 2:
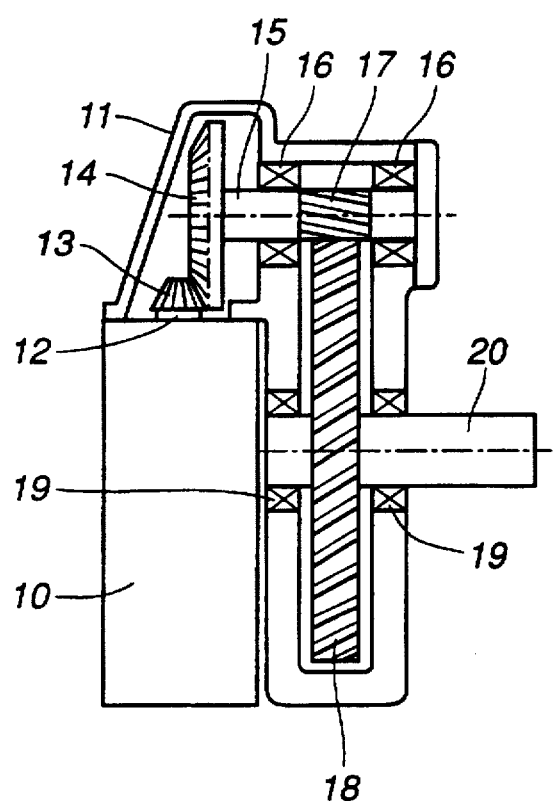
FIG. 2 is a vertical section taken through the driving unit.
Figure 1:
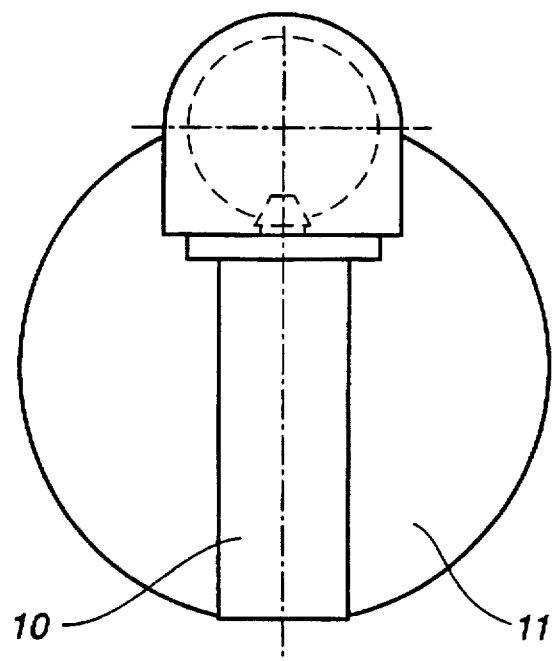
FIG. 1 is a side view of a driving unit according to the invention.

The driving unit shown in the drawing is intended to be fixed to the stand of an industrial robot of the type described above for rotating, for example, the first robot arm about a horizontal axis. The driving unit comprises a long and narrow motor 10 mounted to a gear case 11. The motor is oriented with its shaft 12 at right angles to a horizontal line parallel to the axis of the first arm, and its projection lies on the gear case. The gear case encloses a gear unit in two steps, the first one being a bevel gear pair and the second one a cylindrical gear pair.

FIG. 2 shows a section through the gear case 11. On the motor shaft 12 there is fixed a bevel pinion 13, which is in engagement with a larger bevel gear 14 fixed to the outer end of an intermediate shaft 15. The intermediate shaft is centered by two bearings 16. Between the bearings, a smaller cylindrical gear 17 is fixed to the intermediate shaft 15, which gear meshes with a larger cylindrical gear 18 fixed to an output shaft 20 centered by two bearings 19.

A higher speed of the motor requires a higher gear ratio of the gear unit. With normal gear cutting of a gear pair with rolling contact only, a maximum gear ratio of 10:1 is obtained. The efficiency of such a gear is 98% for each step. This means that the losses are small even if the gear unit is composed of several steps. On the other hand, the volume and the cost increase for each step. To obtain a gear ratio of 240:1, unrealistic diameters of the larger gears are obtained with a parallel-axes gear unit in two steps. In a three-step gear unit, reasonable gear wheel diameters are obtained, but this means that both the overall volume and the manufacturing cost increase. The increase in cost of the third step is then so large that a three-step gear unit is not economically viable.

A bevel gear pair which has rolling contact only normally gives a maximum gear ratio of 10:1. In a hypoid gear, where the torque is transmitted through a combined rolling and sliding contact, a gear ratio of 15:1 may be achieved. However, the efficiency drops by 3% to about 95%. Larger gear ratios may be obtained with spiroid gears and pure worm gears, but the efficiency drops drastically. In a pure worm gear pair with sliding contact only, the efficiency is about 50%. The latter gears are self-inhibiting, whereby the gear may become locked at an impulse moment force from the robot shaft. Such locking cannot be accepted in industrial robots.

The smallest number of teeth on a gear is dependent on the size of the cutting tool. Normally, therefore, it is not possible to manufacture gears with a smaller number of teeth than 11. By different methods such as undercutting and addendum modification, the number of teeth may be reduced. The first method, however, entails a weakening of the root of the tooth whereas the second method entails a weakening of the addendum. With a tooth profile described in Journal of Mechanical Design, Sep. 1990, vol. 112, pp. 430–436, gears with an extremely low number of teeth may be manufactured, whereby toothed gearings with a large gear ratio and a low sensitivity to play caused by centre deviations may be achieved. With a combination of a hypoid gear pair and a parallel-axes gear with a gear cutting according to the above, it is therefore possible to provide a gear ratio of 240:1 in two steps.

I claim:

1. A driving unit for an industrial robot, comprising an electric motor having a shaft extending in a first direction, said shaft of said motor being gear connected to an output shaft extending in a second direction perpendicular to said first direction with central axes of said shafts intersecting, said shaft of said motor being gear connected to said output shaft via a reduction angle gear unit comprising a non-hypoid bevel gear pair provided between said shaft of said motor and an intermediate shaft, said reduction angle gear unit further comprising a unit of parallel-axes gears respectively provided on said intermediate shaft and said output shaft, a gear case encasing said reduction angle gear unit, said case having a major dimension overlying said gear provided on said output shaft and perpendicular thereto, said motor having a length extending along said shaft thereof, said motor having a width transverse to said length, the length of the motor being greater than the width, and said motor overlying said case at the major dimension thereof without said motor extending beyond an outer dimension of said case such that a projection of the length and width of the motor in said second direction lies on the gear case, whereby the gear unit has the properties of high reduction gear ratio with a minimum of play, fast acceleration and a minimum overall volume.

2. The driving unit according to claim 1, wherein the gear ratio between said shaft of said motor and said output shaft is greater than 170:1.

3. The driving unit according to claim 1, wherein the number of teeth of the gear on said intermediate shaft is less than 10.

* * * * *